US008720853B2

(12) United States Patent
Knott

(10) Patent No.: US 8,720,853 B2
(45) Date of Patent: May 13, 2014

(54) CONTAINER TREATMENT MACHINE AND DELIVERY PIPE SECTION

(75) Inventor: Josef Knott, Schierling (DE)

(73) Assignee: KRONES AG, Neutraubling (DE)

( * ) Notice: Subject to any disclaimer, the term of this patent is extended or adjusted under 35 U.S.C. 154(b) by 823 days.

(21) Appl. No.: 12/667,254

(22) PCT Filed: Jul. 9, 2008

(86) PCT No.: PCT/EP2008/005607
§ 371 (c)(1), (2), (4) Date: May 6, 2010

(87) PCT Pub. No.: WO2009/007108
PCT Pub. Date: Jan. 15, 2009

(65) Prior Publication Data

US 2010/0223891 A1 Sep. 9, 2010

(30) Foreign Application Priority Data

Jul. 10, 2007 (DE) ........................ 10 2007 031 961

(51) Int. Cl.
*F16K 51/00* (2006.01)

(52) U.S. Cl.
USPC ............ 251/144; 138/109; 285/412; 285/414

(58) Field of Classification Search
USPC ........... 251/144; 137/391, 395; 138/109, 177, 138/DIG. 11; 285/413, 414, 415, 412
See application file for complete search history.

(56) References Cited

U.S. PATENT DOCUMENTS 1,556,745 A * 10/1925 Banta ............................ 285/374
2,568,414 A * 9/1951 Russ ............................... 285/55
3,088,758 A * 5/1963 Chilton ......................... 285/187
3,206,530 A * 9/1965 Boteler ......................... 264/259
3,775,589 A * 11/1973 Camp ........................... 392/337
3,968,552 A * 7/1976 Hunter ....................... 29/890.15
4,432,572 A * 2/1984 Thalmann ..................... 285/412
5,878,992 A 3/1999 Edwards et al.
5,961,153 A * 10/1999 Foster ............................. 285/15
7,178,838 B2 * 2/2007 Chelchowski et al. ....... 285/354
7,472,723 B2 * 1/2009 Marcolin ...................... 138/125
7,604,217 B2 * 10/2009 Lum ............................. 251/148
7,721,773 B2 * 5/2010 Stadlmayr et al. ............ 141/302
8,231,146 B2 * 7/2012 Lum ............................. 285/414
2002/0064880 A1 5/2002 Merten et al.

FOREIGN PATENT DOCUMENTS

| | | | |
|---|---|---|---|
| AU | 85990 82 | A | 2/1983 |
| DE | 4309429 | A1 | 9/1994 |
| DE | 10343281 | A1 | 4/2005 |
| EP | 0827936 | A1 | 3/1998 |
| GB | 1 317 758 | A | 5/1973 |
| JP | 4834133 | | 5/1973 |
| WO | WO 01/73332 | A2 | 10/2001 |

* cited by examiner

*Primary Examiner* — John K Fristoe, Jr.
*Assistant Examiner* — R. K. Arundale
(74) *Attorney, Agent, or Firm* — Marshall, Gerstein & Borun LLP

(57) ABSTRACT

A container treatment machine with a tank and spaced-apart valve housings, wherein a pressure-resistant delivery pipe having a curved section is provided between the tank and each valve housing directly or via an intermediate flow regulator, the delivery pipe being composed, at least in its curved section, of a hard plastic which is pressure- and temperature-resistant, and is acid- and alkali-resistant and permissible for foodstuffs, in particular polytetrafluoroethylene (PTFE or Teflon).

6 Claims, 2 Drawing Sheets

CONTAINER TREATMENT MACHINE AND DELIVERY PIPE SECTION

CROSS-REFERENCE TO RELATED APPLICATION

The present application claims the benefit of priority of International Patent Application No. PCT/EP2008/005607, filed Jul. 9, 2008, which application claims priority of German Patent Application No. 102007031961.6, filed Jul. 10, 2007. The entire text of the priority application is incorporated herein by reference in its entirety.

FIELD OF THE DISCLOSURE

The disclosure relates to a container treatment machine according to the preamble of patent claim 1 and to a delivery pipe section such as using in beverage bottling operations.

BACKGROUND

In the container treatment machine according to DE 43 09 429 A, which is configured as a filler, the delivery pipe is a stainless steel pipe with a curved section. A flow meter is mounted between the tank and the respective valve housing.

In the container treatment machine known from DE 103 43 281 A1, which is configured as a filler and is intended for filling beverages enriched with oxygen or an oxygen/gas mixture into bottles, each delivery pipe is made of stainless steel, with the tank being connected via a straight pipe section to a flow meter and the flow meter being connected via a curved section of the delivery pipe to the valve housing.

Although, as a rule, the tank and the valve housings of such container treatment machines are mounted on a common carrier, cyclic bending stresses occur between the tank and the valve housings in the curved section of the delivery pipe as a result of unavoidable production and mounting tolerances and, above all, operation-dependent relative positional changes during the operation, which, in the course of time, lead to microcracks and damages on the outer side of the curvature of the section.

In the container treatment machine according to JP-48-34133 A, which is configured as a filler, the tank is connected to the valve housings via flexible hoses which are laid in a curved fashion. This principle is usable only for still liquids that are processed substantially with no pressure. Nevertheless, the hoses can age and become brittle as a result of external and internal influences.

SUMMARY OF THE DISCLOSURE

The disclosure is based on the object to improve a container treatment machine and a delivery pipe section of the aforementioned type with regard to their reliability during operation, namely regardless of whether liquids enriched with aggressive gases or substances, cleaning liquids and the like are processed under pressure or with little pressure, in a hot, cold or cooled state.

The section of the delivery pipe, which is manufactured integrally from a plastic material, has, due to its material, such a flexibility that operation-dependent relative movements between the tank and the valve housings and the flow meter, respectively, are absorbed without there being a risk of microcracks, and mounting tolerances are compensated. The plastic material is sufficiently pressure- and temperature-resistant, acid- and alkali-resistant and permissible for foodstuffs, so that practically any liquid, that is, liquids intended for filling under pressure or with no pressure or with or without additives, as well as cleaning liquids or alkaline cleaning solutions can be processed without any problems, and also regardless of whether these liquids or gases are subcooled or heated. The pressure resistance of the plastic material has to withstand the known maximum pressures that occur during the filling and cleaning of containers. The temperature resistance takes into account the high or low temperatures of the liquids and gases that occur during the filling and cleaning. The acid and alkali resistance withstands acid components or alkaline solutions or gases, respectively. The permissibility for foodstuffs fulfils the requirements, e.g. if containers such as bottles are filled with beverages.

The delivery pipe section may be an original equipment part or a retrofit part for container treatment machines that had already been in operation, and it precludes the damages that could previously not be prevented with stainless steel pipes.

Expediently, the plastic material is non-reinforced polytetrafluoroethylene with a hard formulation, so that this type of plastic material results in a flexibility of the delivery pipe section by means of which the delivery pipe section can be easily bent, e.g. manually, and automatically rebounds.

In view of an aesthetically attractive appearance the polytetrafluoroethylene should be all-white, expediently without a reinforcement.

According to an expedient embodiment the section comprises a knee bend, preferably an approximately 90° knee bend, largely straight legs, and an external end flange on both ends of the legs. Adjacent to each end flange a constriction is formed into the section. In this embodiment the delivery pipe section is producible cost-effectively and true to size. Particularly favorable is an embodiment comprising an 87° knee bend.

The end flange with the adjacent constriction allows a compact mounting, similar to previously used stainless steel pipes with welded-on flanges, with the advantage important in this field that undercuts in the connecting portion are largely avoided so as to allow a hygienically acceptable cleaning.

Expediently, the outer diameter of the delivery pipe section at the end flanges, in the legs and in the knee bend is substantially the same.

According to an expedient embodiment a metallic mounting flange sits on the end flange and the constriction. In the mounting flange a holding sleeve of plastic or metal is arranged, which is divided, preferably into two, in the longitudinal direction and which is initially omitted when the mounting flange is mounted or dismounted, but is introduced into the constriction and then into the mounting flange only after the end flange has been passed through.

Expediently, the holding sleeve is flush with the end flange so as to define a sealing portion free of an undercut. Moreover, to allow a cooperation with the end flange, the holding sleeve should comprise an inner shoulder and, to allow a cooperation with the mounting flange, an outer shoulder.

Especially after dismounting the holding sleeve, the inner diameter of the mounting flange should be only slightly larger than the outer diameter of the end flange so as to allow the unproblematic introduction and pulling through of the end flange after the holding sleeve was removed.

In a preferred embodiment the constant inner diameter of the delivery pipe section relative to the outer diameter is in a ratio of approximately 0.6 to 0.7. Preferably, the outer diameter is, for instance, 22 mm, while the inner diameter is approximately 14 mm.

The radius of curvature of the axis of the delivery pipe section in the knee bend should be greater than the double outer diameter. Such radii of curvature are easy to handle from a manufacturing point of view and avoid crushes in the inner cross-section.

Moreover, the mounting flange may be connected to at least one other flange, wherein a sealing ring is mounted between the end face of the end flange of the delivery pipe section and an end face of the other flange and is directly adjacent to the orifice of the end flange. This provides for a sealed area in the transitional area which is free of undercuts and does not define hollow spaces which are difficult to clean.

BRIEF DESCRIPTION OF THE DRAWINGS

An embodiment of the subject matter of the disclosure is explained by means of the drawings. In the drawings.

DETAILED DESCRIPTION OF THE PREFERRED EMBODIMENT

Figure 1:
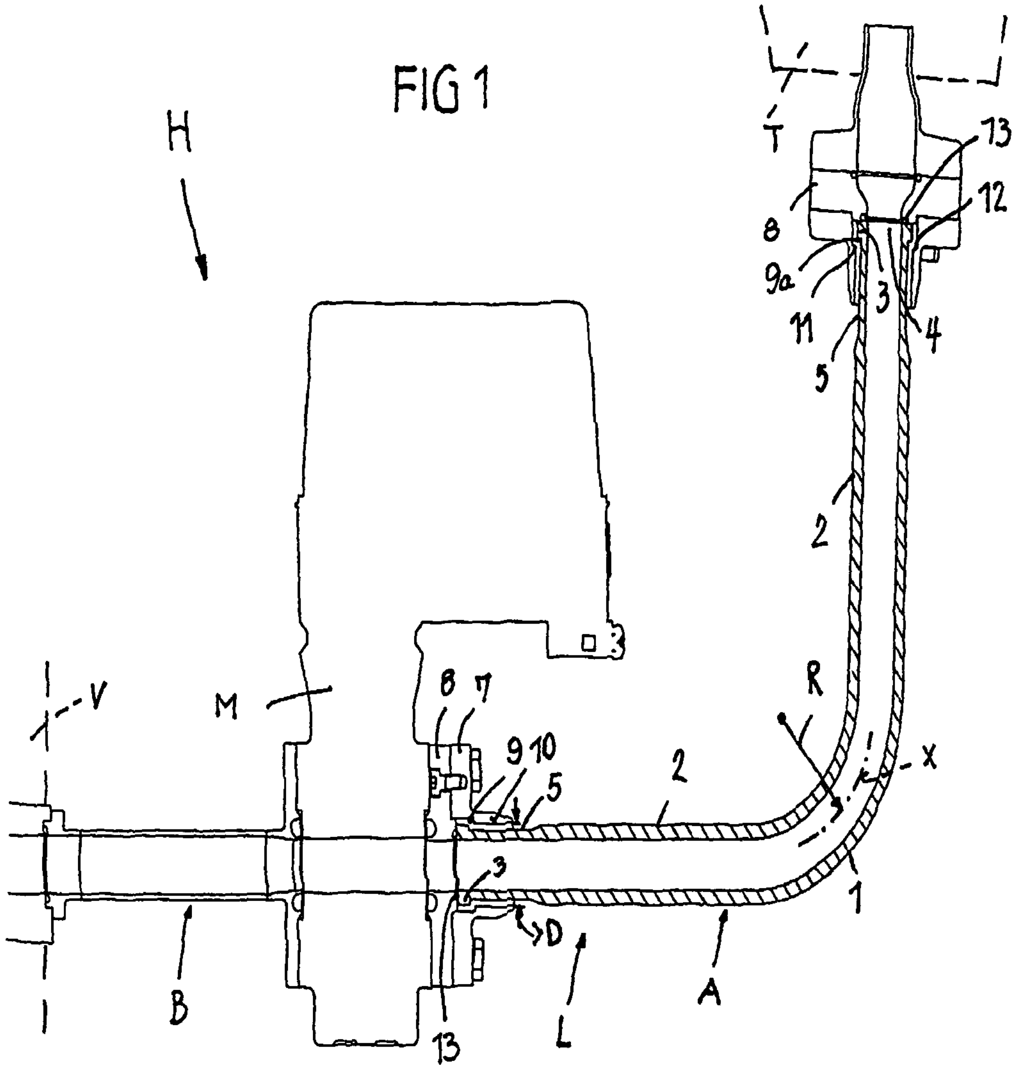
FIG. 1 shows a partial sectional view of a container treatment machine.

FIG. 1 shows a portion of a container treatment machine H, for instance, of a filler for the filling of containers such as bottles with beverages (or of a rinser), comprising a tank T arranged at the top and valve housings V located under the tank and spaced away from same (only one valve housing V is outlined). A delivery pipe L is installed between the valve housing V and the tank T, which, in this case, is formed, for instance, of a curved section A and a straight section B, with a flow meter M being arranged between sections A, B. The flow meter M shown in FIG. 1 may also be omitted, however, depending on the individual case. In the present case, the delivery pipe section A is directly connected to the valve housing V.

Figure 2:
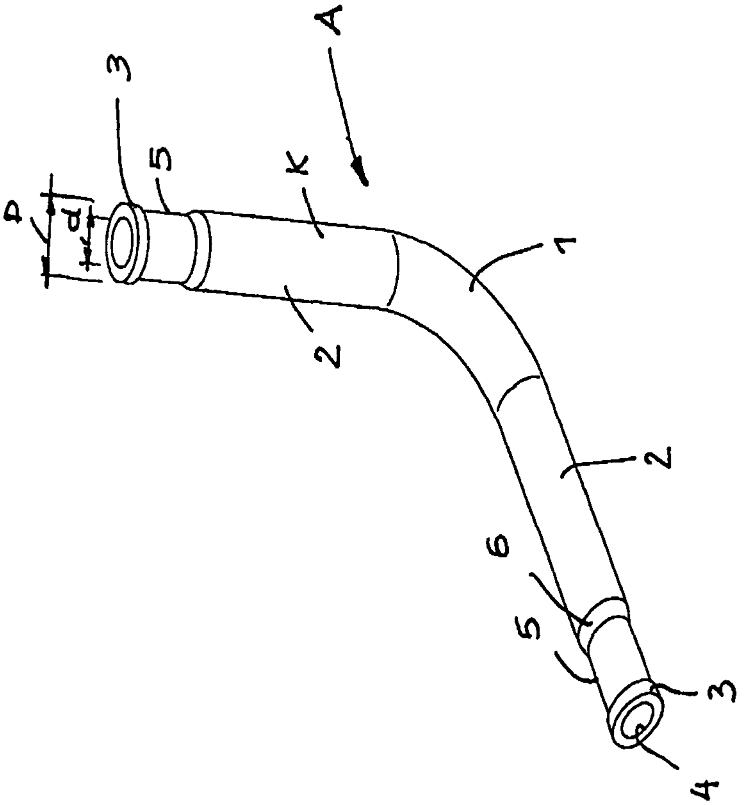
FIG. 2 shows a perspective view of a delivery pipe section for such a container treatment machine.

FIG. 2 shows a perspective and detailed view of the delivery pipe section A of FIG. 1. It shows a pipe made of a plastic material K. The delivery pipe section A comprises a knee bend 1, e.g. a 90° knee bend, and substantially straight legs 2 originating at the knee bend 1 and ending at outwardly projecting end flanges 3. Adjacent to each end flange 3 a constriction 5 is provided, which is passed into the outer diameter D of the delivery pipe section A via a rounded or tapered transitional area 6. The length of the constriction 5 is a multiple of the length of the end flange 3, whose orifice is designated with 4. The inner diameter of the delivery pipe section is constant and has a dimension d. The ratio of the inner diameter d relative to the outer diameter D is, for instance, 0.6 to 0.7. In a specific embodiment the outer diameter D is, for instance 22 mm, while the inner diameter d is, for instance, 14 mm.

The plastic material K of the delivery pipe section A is, expediently, polytetrafluoroethylene (PTFE or Teflon), e.g. with a hard formulation, wherein the delivery pipe section A is manufactured integrally from the polytetrafluoroethylene, e.g. from an extruded and bent billet, which is machined within the area of the constrictions 5, or as an injection molded part.

In view of the pressures and temperatures occurring in such container treatment machines the polytetrafluoroethylene used is pressure- and temperature-resistant, and it is acid-resistant in view of possible acid components or acidic gases in the liquids, and alkali-resistant in view of alkaline cleaning solutions. Also, it is permissible for foodstuffs. Expediently, the delivery pipe section A is formed of all-white, non-reinforced polytetrafluoroethylene.

The delivery pipe section A may be an original equipment part for such container treatment machines or a retrofit part for container treatment machines that had already been in operation.

According to FIG. 1, the connection of each end of the legs of delivery pipe section A is accomplished with a mounting flange 7, preferably a metallic mounting flange 7, which sits on the constriction 5 with the aid of a longitudinally divided holding sleeve 9 and interacts via the holding sleeve 9 with the end flange 3 so as to secure the end flange 3 via an interposed sealing ring 13 against a connecting surface either of the valve housing V or the flow meter M or an end face of another flange 8, which is connected to the mounting flange 7.

The mounting flange 7 comprises in an inner bore 10 a shoulder 12 to cooperate with an outer shoulder 11 of the holding sleeve 9. The holding sleeve 9, in turn, comprises an inner shoulder 9*a* to cooperate with the end flange 3. The inner bore 10 of the mounting flange 7 has a diameter which is slightly larger than the outer diameter D.

The radius of curvature R in the knee bend 1 is, relative to the axis X of the delivery pipe section, for instance greater than the double outer diameter D.

In order to mount the delivery pipe section A, initially the mounting flange 7, with the divided holding sleeve 9 being omitted, is passed over the end flange 3 up to the area of the constriction 5. Then, the mounting flange 7 is shifted further onto the leg 2 so as to expose the constriction 5. Next, the parts of the holding sleeve 9 are placed onto the constriction. Then, the mounting flange 7 is shifted back again until it glides over the holding sleeve 9 and pulls it towards the end flange 3. Expediently, the holding sleeve 9 is flush with the end flange 3, while the mounting flange 7 is slightly projecting. Then, the sealing ring 13 is inserted before the mounting flange 7 is secured against the connecting surface or the other flange 8. If appropriate, the delivery pipe section A together with the holding sleeve 9 and flanges 7, 8 screwed to each other is prefabricated as a unit and is already equipped with the sealing rings 13.

Thanks to this mounting mode the sealing ring 13 can be placed directly adjacent to the orifice 4 of the end flange 3, so that there is no undercut in the connecting area that is difficult to clean.

Alternatively, the mounting flange 7 could also be screwed, glued or welded onto the end of the leg.

I claim:

1. Container treatment machine, especially a filler or rinser, comprising a tank and valve housings arranged under the tank and spaced away therefrom, a pressure-resistant delivery pipe having a curved section provided between the tank and each valve housing one of directly or via an interposed flow meter, the delivery pipe being integrally formed, at least in its curved section, of a hard plastic material which is pressure- and temperature-resistant, acid- and alkali-resistant and permissible for foodstuffs, and wherein the curved section comprises a knee for connecting the curved section to a connecting surface of the flow meter or of the valve housing, largely straight legs each having a leg end, an outwardly projecting end flange on each leg end, and a constriction adjacent to each outwardly projecting end flange, the length of the constriction a multiple of the length of the outwardly protruding end flange, wherein a metallic mounting flange fits on the outwardly projecting end flange and the constriction and projects beyond an end face of the outwardly projecting end flange, wherein a holding sleeve is arranged in the mounting flange, the holding sleeve being divided in a longitudinal direction into at least two parts, the respective lengths of the mounting flange and the holding sleeve being shorter than the length of the constriction, wherein the holding sleeve is flush with the outwardly projecting end flange and comprises an inner shoulder to allow a cooperation with the outwardly projecting end flange, and comprises an outer shoulder to allow a cooperation with the mounting flange, wherein an inner diameter of an inner bore of the mounting flange is larger than an outer diameter of the outwardly protruding end flange, and wherein the inner bore of the mounting flange comprises a shoulder to allow cooperation with the outer shoulder of the holding sleeve.

2. Delivery pipe section according to claim 1, wherein the plastic material is non-reinforced polytetrafluoroethylene.

3. Delivery pipe section according to claim 2, wherein the non-reinforced polytetrafluoroethylene is white.

4. Delivery pipe section according to claim 1, wherein the section comprises a knee bend with largely straight legs, wherein an outer diameter of the section at the outwardly projecting end flanges, in the legs, and in the knee bend is substantially the same.

5. Delivery pipe section according to claim 1, wherein the mounting flange is connected to at least one other flange provided at the connecting surface of the valve housing or the flow meter, and wherein a sealing ring is mounted between an end face of the outwardly projecting end flange and an end face of the other flange and is directly adjacent to an orifice in the end face of the outwardly projecting end flange.

6. Delivery pipe section according to claim 1, wherein the holding sleeve is formed of one of plastic or metal.

* * * * *